(12) United States Patent
Mori et al.

(10) Patent No.: US 11,958,544 B2
(45) Date of Patent: Apr. 16, 2024

(54) CONTROL DEVICE FOR ELECTRIC POWER STEERING DEVICE

(71) Applicant: Mitsubishi Electric Corporation, Tokyo (JP)

(72) Inventors: Tatsuya Mori, Tokyo (JP); Yu Hirotani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 740 days.

(21) Appl. No.: 17/056,517

(22) PCT Filed: Jul. 13, 2018

(86) PCT No.: PCT/JP2018/026502
§ 371 (c)(1),
(2) Date: Nov. 18, 2020

(87) PCT Pub. No.: WO2020/012644
PCT Pub. Date: Jan. 16, 2020

(65) Prior Publication Data
US 2021/0206425 A1    Jul. 8, 2021

(51) Int. Cl.
*B62D 5/04*        (2006.01)
*B62D 1/28*        (2006.01)
*H02P 5/74*        (2006.01)

(52) U.S. Cl.
CPC ........... *B62D 5/0463* (2013.01); *B62D 1/286* (2013.01); *H02P 5/74* (2013.01)

(58) Field of Classification Search
CPC .......... B62D 5/0463; B62D 1/286; H02P 5/74
(Continued)

(56) References Cited

U.S. PATENT DOCUMENTS 6,112,846 A * 9/2000 Mukai .................. B62D 5/0469
                                                    180/443
7,394,214 B2* 7/2008 Endo ...................... B62D 5/046
                                                    318/434
(Continued)

FOREIGN PATENT DOCUMENTS

JP            2001-275381 A       10/2001

OTHER PUBLICATIONS

Chabaan Rakan, Optimal Control and Gain Scheduling of Electrical Power Steering Systems, published 2009 IEEE, pp. 53-59.*

(Continued)

*Primary Examiner* — Manglesh M Patel
(74) *Attorney, Agent, or Firm* — Sughrue Mion, PLLC; Richard C. Turner

(57) ABSTRACT

A control device for an electric power steering device includes an inverter converting direct current voltage into alternating current voltage, and apply to a synchronous motor; and a controller for converting three-phase current flowing in the synchronous motor into d-axis and q-axis currents, performing proportional integral control for a deviation between q-axis current command and the q-axis current so that the q-axis current follows the q-axis current command, to calculate q-axis voltage command, performing proportional integral control to calculate d-axis voltage command, converting the d-axis and q-axis voltage commands into three-phase voltage command, and controlling the inverter based on the three-phase voltage command. A q-axis proportional gain used in the proportional integral control for the q-axis current is obtained using a time constant of a q-axis current control system, a q-axis or d-axis inductance, and a constant greater than zero and less than one.

14 Claims, 9 Drawing Sheets

(58) Field of Classification Search
USPC .................................................. 701/41, 42
See application file for complete search history.

(56) References Cited

U.S. PATENT DOCUMENTS

| | | | | |
|---|---|---|---|---|
| 10,583,857 | B2* | 3/2020 | Tsubaki | B62D 1/286 |
| 2004/0207377 | A1* | 10/2004 | Shimada | H02M 3/158 |
| | | | | 323/284 |
| 2005/0263330 | A1* | 12/2005 | Gallagher | B62D 5/046 |
| | | | | 180/65.1 |
| 2007/0205041 | A1* | 9/2007 | Nishizaki | B62D 5/0472 |
| | | | | 180/446 |
| 2007/0284180 | A1* | 12/2007 | Suehiro | B62D 5/0469 |
| | | | | 180/444 |
| 2008/0067960 | A1* | 3/2008 | Maeda | B62D 5/046 |
| | | | | 180/443 |
| 2008/0201041 | A1* | 8/2008 | Jiang | B62D 5/046 |
| | | | | 318/632 |
| 2008/0217099 | A1* | 9/2008 | Reungwetwattana | |
| | | | | B62D 5/0472 |
| | | | | 180/446 |
| 2008/0294313 | A1* | 11/2008 | Aoki | B62D 5/0463 |
| | | | | 701/43 |
| 2009/0167224 | A1* | 7/2009 | Miura | H02P 6/10 |
| | | | | 318/400.23 |
| 2011/0000738 | A1* | 1/2011 | Horii | B62D 5/0463 |
| | | | | 180/446 |
| 2012/0145472 | A1* | 6/2012 | Imamura | H02P 21/0003 |
| | | | | 180/446 |
| 2012/0176069 | A1* | 7/2012 | Sagami | B62D 5/0487 |
| | | | | 318/400.02 |
| 2013/0328509 | A1* | 12/2013 | Jang | H02P 21/06 |
| | | | | 318/400.02 |
| 2015/0232120 | A1* | 8/2015 | Aono | B62D 5/0466 |
| | | | | 701/42 |
| 2017/0253269 | A1* | 9/2017 | Kanekawa | B62D 5/0481 |
| 2017/0369093 | A1* | 12/2017 | Kusatani | H02P 29/032 |
| 2018/0241334 | A1* | 8/2018 | Kobayashi | B62D 6/00 |
| 2019/0322309 | A1* | 10/2019 | Takase | B62D 6/00 |

OTHER PUBLICATIONS

Jaszczolt et al., Understanding permanent magnet motors, published Jan. 31, 2017 Control Engineering, pp. 1-23 (pdf).*
Babayomi et al., Loss Minimizing Control of PMSM for Electric Power Steering, published 2015 IEEE, pp. 438-443.*
Khasawneh et al., A Robust Electric Power-Steering-Angle Controller for Autonomous Vehicles with Disturbance Rejection, published 2022 electronics, pp. 1-17 (pdf).*
Shriwastava et al., Design of a Permanent Magnet Synchronous Machine for the Eletric Power Steering, published Mar. 2022 International Journal of Engineering Research and Applications, vol. 1, Issue 3, pp. 646-653.*
"Principles and methods of designing of energy saving motor", Kagakujyoho shuppan Co., Ltd., Jul. 2013, (See, for example, formula (4-9) in p. 101).
"Sensorless vector control for AC drive system", Ohmsha, Ltd., edited by Institute of electrical engineers of Japan / Advisory committee of investigation regarding summary of sensorless vector control, Sep. 2016, p. 102 formula (2-39).
International Search Report for PCT/JP2018/026502, dated Oct. 16, 2018.

* cited by examiner

FIG. 5

| RESPONSE FREQUENCY (ωcq/2π) [Hz] | | 159 | 177 | 199 | 227 | 265 | 318 | 398 | 531 | 796 | 1061 | 1592 |
|---|---|---|---|---|---|---|---|---|---|---|---|---|
| TIME CONSTANT τq [μs] | VOLTAGE COMMAND UPDATING CYCLE T [μs] | 1000 | 900 | 800 | 700 | 600 | 500 | 400 | 300 | 200 | 150 | 100 |
| 500 | | 0.4482 | 0.4355 | 0.4244 | 0.4159 | 0.4114 | 0.4135 | 0.4250 | 0.4551 | 0.5098 | 0.5471 | 0.5725 |
| 450 | | 0.4352 | 0.4252 | 0.4173 | 0.4126 | 0.4126 | 0.4198 | 0.4382 | 0.474 | 0.5355 | 0.5758 | 0.6057 |
| 400 | | 0.424 | 0.4173 | 0.4132 | 0.4127 | 0.4177 | 0.4306 | 0.4553 | 0.4978 | 0.5653 | 0.6079 | 0.5725 |
| 350 | | 0.4161 | 0.4132 | 0.4134 | 0.4178 | 0.4283 | 0.4473 | 0.4786 | 0.5273 | 0.5998 | 0.6438 | 0.6793 |
| 300 | | 0.4132 | 0.4149 | 0.4201 | 0.4301 | 0.4466 | 0.4721 | 0.5098 | 0.5643 | 0.6396 | 0.6834 | 0.7196 |
| 250 | | 0.4188 | 0.4258 | 0.4367 | 0.4529 | 0.4758 | 0.5076 | 0.5512 | 0.6095 | 0.6849 | 0.727 | 0.7621 |
| 200 | | 0.4386 | 0.4516 | 0.4688 | 0.4913 | 0.5205 | 0.5578 | 0.6053 | 0.6646 | 0.7361 | 0.7744 | 0.8066 |
| 150 | | 0.4827 | 0.502 | 0.5253 | 0.5534 | 0.5872 | 0.6274 | 0.6751 | 0.7306 | 0.7934 | 0.8257 | 0.8529 |
| 125 | | 0.5192 | 0.5413 | 0.507 | 0.5968 | 0.6314 | 0.6712 | 0.7167 | 0.7681 | 0.8243 | 0.8527 | 0.8765 |
| 100 | | 0.5698 | 0.5937 | 0.6208 | 0.6507 | 0.6844 | 0.7219 | 0.7633 | 0.8085 | 0.8567 | 0.8806 | 0.9006 |
| 75 | | 0.6388 | 0.6627 | 0.6887 | 0.7169 | 0.7473 | 0.78 | 0.815 | 0.8521 | 0.8905 | 0.9093 | 0.925 |
| 50 | | 0.7312 | 0.752 | 0.7739 | 0.7968 | 0.8207 | 0.8457 | 0.8717 | 0.8986 | 0.9258 | 0.9388 | 0.9497 |
| 25 | | 0.8512 | 0.8643 | 0.8776 | 0.8912 | 0.9051 | 0.9192 | 0.9335 | 0.9481 | 0.9623 | 0.9691 | 0.9747 |

REGIONS ENCLOSED BY THICK LINES: INDICATING VALUES, WITH WHICH OVERSHOOT AMOUNT BEING LESS THAN 10% OF STEP WIDTH

US 11,958,544 B2

CONTROL DEVICE FOR ELECTRIC POWER STEERING DEVICE

CROSS REFERENCE TO RELATED APPLICATIONS

This application is a National Stage of International Application No. PCT/JP2018/026502 filed Jul. 13, 2018.

TECHNICAL FIELD

The present invention relates to a control device for an electric power steering device.

BACKGROUND ART

Conventionally, permanent magnet synchronous motors provided with rotors having permanent magnets have been used as assist motors for electric power steering devices. Permanent magnet synchronous motors are sometimes also referred to as brushless motors. For controlling permanent magnet synchronous motors, a vector control method is commonly used. In the vector control method, electric currents are controlled with respect to a d-axis extending in a direction of magnetic pole positions in the rotor, and electric currents are controlled with respect to a q-axis, which has an electric angle having a phase difference by 90 degrees from an electric angle of the d-axis.

In the above-described vector control method, proportional integral control (PI control) is performed for a deviation between an electric current command, which is a command of an electric current flowing in the permanent magnet synchronous motor, and a detection current, which is a detected value of the electric current flowing in the permanent magnetic synchronous motor. According to the above-described operation, a voltage command, which is a command value of voltage applied to the permanent magnet synchronous motor, is calculated.

It has been known that, for the above-described control method, a proportional gain design described as follows is preferably performed (See, for example, non-patent document 1 and non-patent document 2). In the proportional gain design, a d-axis proportional gain is set to $\omega_c \times L_d$, and a q-axis proportional gain is set to $\omega_c \times L_q$, where $\omega_c$ is a response angular frequency of a current control system, $L_d$ is a d-axis inductance, and $L_q$ is a q-axis inductance. The response angular frequency $\omega_c$ is almost proportional to an inverse of a time constant of the current control system $\tau_c$.

Moreover, the proportional gain is known to be capable of being changed in response to fluctuations of the d-axis inductance and the q-axis inductance according to magnetic saturation (See, for example, patent document 1).

In the electric power steering device, it is important to set the time constant of the current control system to a predetermined designed value. When a time constant is actually smaller than the designed value, noise components contained in the above-described detection current are fed back to the current control system, and abnormal sound occurs from the electric power steering device. Then, passengers of a vehicle feel discomfort. On the other hand, when the time constant is actually greater than the designed value, a delay occurs in a response of a torque generated by the permanent magnet synchronous motor to a steering torque, i.e. a torque assisting the steering. Then, a steering feeling for a steering wheel by a driver of the vehicle degrades.

CITATION LIST

Patent Literature

[PTL 1] JP 2001-275381 A

Non-Patent Literature

[NPL 1] "Principles and methods of designing of energy saving motor", Kagakujyoho shuppan Co., Ltd., July 2013 (See, for example, formula (4-9) in page 101).

[NPL 2] "Sensorless vector control for AC drive system", Ohmsha, Ltd., edited by Institute of electrical engineers of Japan/Advisory committee of investigation regarding summary of sensorless vector control, September 2016 (See, for example, formula (2-39) in page 102).

SUMMARY OF INVENTION

Technical Problem

In the case where the above-described vector control is performed according to discrete time control by a processor, such as a microcomputer or a digital signal processor (DSP), the voltage command is updated at every predetermined period as the vector control is performed at every the period.

In this case, unless the period for updating the voltage command is sufficiently smaller than the time constant of the current control system, even when the above-described proportional gain design is performed, the time constant of the current control system does not become the designed value as desired.

That is, in the case of performing the above-described vector control according to the discrete time control, unless the period for updating the voltage command is sufficiently smaller than the time constant of the current control system, even when the above-described proportional gain design is performed, a time constant of the current control system is actually deviated from the designed value.

The present invention has been made to solve the problem described above, and has an object to obtain a control device for an electric power steering device, in which an amount of deviation of an actual time constant of a current control system from a designed value of the time constant can be reduced, even when a vector control is performed according to a discrete time control.

Solution to Problem

According to an aspect of the present invention, there is provided a control device for an electric power steering device including a direct current power source outputting direct current voltage; an inverter configured to convert direct current voltage output from the direct current power source into alternating current voltage, and apply the alternating current voltage to a synchronous motor; and a controller configured to convert three-phase current flowing in the synchronous motor into d-axis current and q-axis current, perform proportional integral control for a deviation between a d-axis current command and the d-axis current so that the d-axis current follows the d-axis current command, to calculate a d-axis voltage command, perform proportional integral control for a deviation between a q-axis current command and the q-axis current so that the q-axis current follows the q-axis current command, to calculate a q-axis voltage command, convert the d-axis voltage command and the q-axis voltage command into a three-phase voltage command, and control the inverter based on the three-phase voltage command, a q-axis proportional gain $K_{pq}$, which is used in the proportional integral control performed for the deviation between the q-axis current command and the q-axis current, is set by a relation $K_{pq}=K_q/\tau_q \times L$, where $T_q$ is a time constant of a q-axis current control system, L is a q-axis inductance or a d-axis inductance, $K_q$ is a constant greater than 0 and less than 1.

Advantageous Effects of Invention

According to the present invention, it is possible to obtain a control device for an electric power steering device, in which an amount of deviation of an actual time constant of a current control system from a designed value of the time constant can be reduced, even when a vector control is performed according to a discrete time control.

BRIEF DESCRIPTION OF DRAWINGS

FIG. 5 is a table showing results of calculations of a constant $K_q$ for various values of a voltage command updating cycle $T_v$ and a response frequency ($\omega_{cq}/2\pi$) according to the first embodiment.

DESCRIPTION OF EMBODIMENTS

Figure 1:
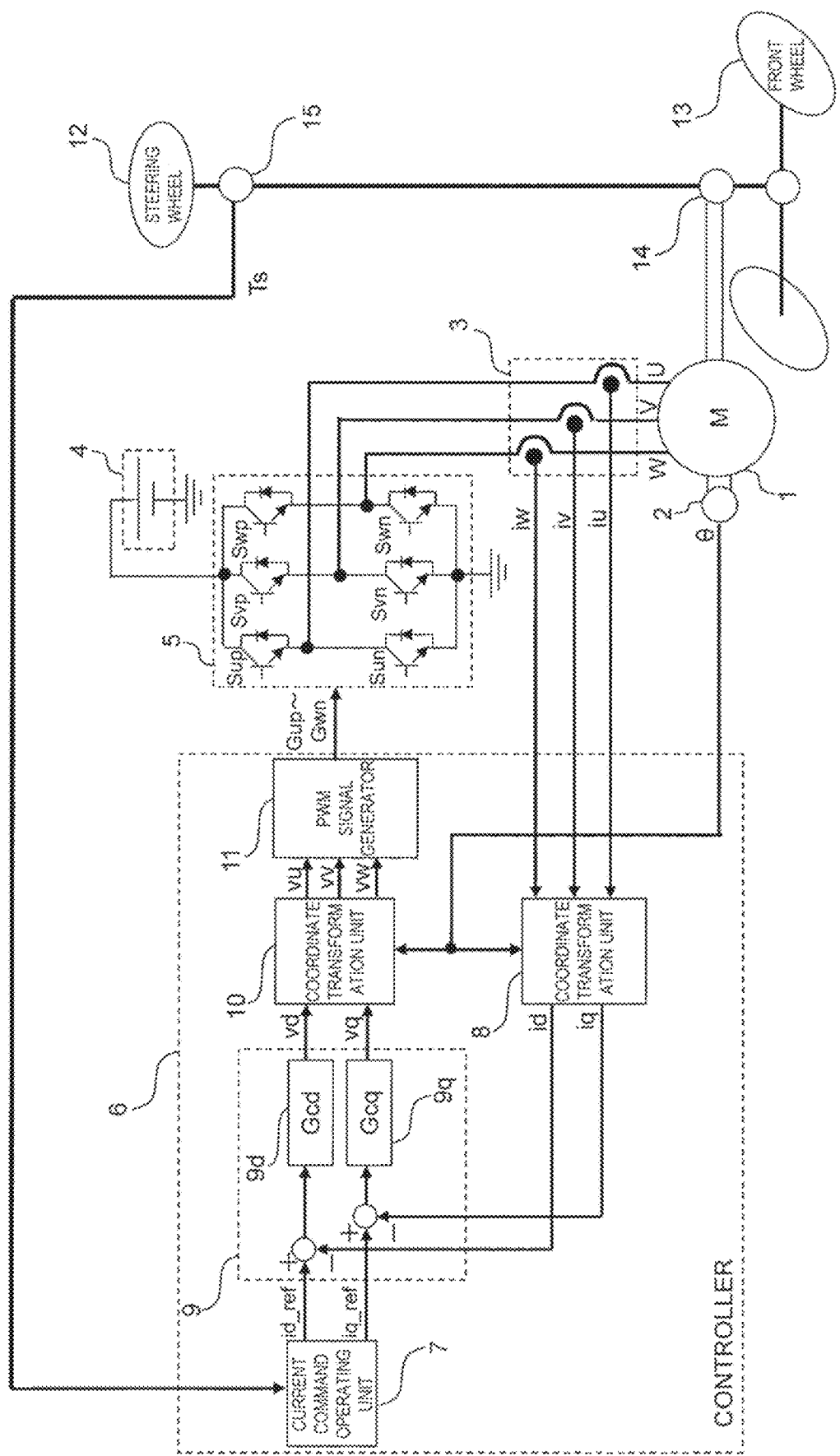
FIG. 1 is a diagram depicting a configuration of an electric power steering device provided with a control device for electric power steering device according to a first embodiment.

In the following, a control device for an electric power steering device according to preferred embodiments will be described with reference to drawings. In the description of the drawings, the same or corresponding components are denoted with the same reference numerals, respectively, and redundant description will be omitted.

First Embodiment

FIG. 1 is a diagram depicting a configuration of an electric power steering device provided with a control device for electric power steering device according to a first embodiment.

The electric power steering device, illustrated in FIG. 1, includes a control device for electric power steering device having a synchronous motor 1, a magnetic pole position detector 2, a current detector 3, a direct current power source 4, an inverter 5, and a controller 6; a gear unit 14; and a torque detector 15.

A driver of a vehicle, on which the electric power steering device shown in FIG. 1 is mounted, turns a steering wheel 12 in the clockwise direction or the counterclockwise direction to steer front wheels 13. The torque detector 15 detects a steering torque Ts of a steering system, and outputs the steering torque Ts to the controller 6.

The synchronous motor 1 generates a torque assisting the steering torque via the gear unit 14. The synchronous motor 1 is provided with a stator including a U-phase winding portion, a V-phase winding portion and a W-phase winding portion; and a rotor having permanent magnets. The rotor is connected to the gear unit 14.

The synchronous motor 1 is not limited to a motor provided with a rotor having permanent magnets, and may be a motor, in which a rotor rotates in synchronization with a rotating magnetic field generated by a stator. Specifically, the synchronous motor 1 may be a wound field synchronous motor.

The magnetic pole position detector 2 detects a magnetic pole position θ in the rotor of the synchronous motor 1, and outputs the detected magnetic pole position θ to the controller 6.

In the following, a direction of the magnetic pole positions in the rotor will be referred to as a d-axis, and an axis having an electric angle having a phase difference by 90 degrees from an electric angle of the d-axis will be referred to as a q-axis. FIG. 1 exemplifies a specific method of obtaining a magnetic pole position θ using the magnetic pole position detector 2 detecting a magnetic pole position θ. However, other known methods for estimating the magnetic pole position θ may be employed. When the known method for estimating the magnetic pole position θ is used, the electric power steering device shown in FIG. 1 may not be provided with the magnetic pole position detector 2.

The current detector 3 detects a U-phase current iu, a V-phase current iv and a W-phase current iw flowing in the U-phase winding portion, the V-phase winding portion and the W-phase winding portion of the synchronous motor 1, respectively. The current detector 3 outputs the detected three-phase current iu, iv and iw, i.e. the U-phase current iu, the V-phase current iv and the W-phase current iw to the controller 6.

The direct current power source 4 outputs a direct current voltage Vdc to the inverter 5. The inverter 5 converts the direct current voltage Vdc output from the direct current power source 4 into an alternating current voltage, and applies the alternating current voltage to the synchronous motor 1. Specifically, the inverter 5 converts the direct current voltage Vdc output from the direct current power source 4 into the alternating current voltage, according to switching signals Gup, Gyp, Gwp, Gun, Gvn, and Gwn, which will be described later, output from the controller 6.

The inverter 5 is provided with switching elements Sup, Svp, Swp, Sun, Svn and Swn. For the switching elements Sup, Svp, Swp, Sun, Svn and Swn, semiconductor switching elements, such as Insulated Gate Bipolar Transistor (IGBT), bipolar transistor, or Metal Oxide Semiconductor Field Effect Transistor (MOSFET) are used.

The switching elements Sup, Svp, Swp, Sun, Svn, and Swn operate in response to the switching signals Gup, Gvp, Gwp, Gun, Gvn, Gwn, respectively. For example, when the switching signal Gup is "1" which corresponds to an instruction of "ON", the switching element Sup is turned ON. When the switching signal Gup is "0" which corresponds to an instruction of "OFF", the switching element Sup is turned OFF. The same applies to the other switching elements Svp, Swp, Sun, Svn, and Swn.

The switching signals Gup, Gvp, Gwp, Gun, Gvn, and Gwn are generated based on three-phase voltage commands vu, vv and vw, i.e. a U-phase voltage command vu, a V-phase voltage command vv, and a W-phase voltage command vw, which will be described later. Thus, it is also said that the inverter 5 applies alternating current voltage to the synchronous motor 1 based on the three-phase voltage commands vu, vv, and vw.

The controller 6 includes an operating unit, such as a microcomputer, or a digital signal processor (DSP), that performs discrete time control. The controller 6 determines the switching signals Gup, Gyp, Gwp, Gun, Gvn, and Gwn based on the steering torque Ts input from the torque detector 15, the three-phase current iu, iv, and iw input from the current detector 3, and the magnetic pole position θ input from the magnetic pole position detector 2; and outputs the switching signals.

In the following, the configurations of the controller 6 will be described in detail. A current command operating unit 7 calculates a d-axis current command id_ref and a q-axis current command iq_ref based on the steering torque Ts input from the torque detector 15.

For example, the current command operating unit 7 calculates the d-axis current command id_ref and the q-axis current command iq_ref according to the relations (1-1) and (1-2) as follows:

[Math 1]

$$id\_ref=0 \quad (1\text{-}1)$$

$$iq\_ref=Ka \times Ts \quad (1\text{-}2)$$

As can be seen from the relations (1-1) and (1-2), the current command operating unit 7 sets the d-axis current command id_ref to 0, and sets the q-axis current command iq_ref to Ka times the steering torque Ts. Ka is a gain depending on a traveling speed of the vehicle.

The current command operating unit 7 may calculate the d-axis current command id_ref and the q-axis current command iq_ref using a known method, such as a Max Torque per Ampere (MTPA) control, or a magnetic flux-weakening control.

A coordinate transformation unit 8 performs coordinate transformation for the three-phase current iu, iv and iw input from the current detector 3 based on the magnetic pole position θ input from the magnetic pole position detector 2, and thereby calculates electric currents on the two rotation axes, i.e. a d-axis current id on the d-axis and a q-axis current iq on the q-axis.

A current controller 9 calculates the d-axis voltage command vd and the q-axis voltage command vq on the two rotation axes, based on the d-axis current command id_ref and the q-axis current command iq_ref input from the current command operating unit 7, and the d-axis current id and the q-axis current iq input from the coordinate transformation unit 8.

A coordinate transformation unit 10 performs coordinate transformation for the d-axis voltage command vd and the q-axis voltage command vq input from the current controller 9 based on the magnetic pole position θ input from the magnetic pole position detector 2, and thereby calculates the three-phase voltage commands vu, vv, and vw on three-phase coordinates.

A PWM signal generator 11 generates the switching signals Gup, Gvp, Gwp, Gun, Gvn, and Gwn based on the three-phase voltage command vu, vv, and vw input from the coordinate transformation unit 10.

Figure 2:
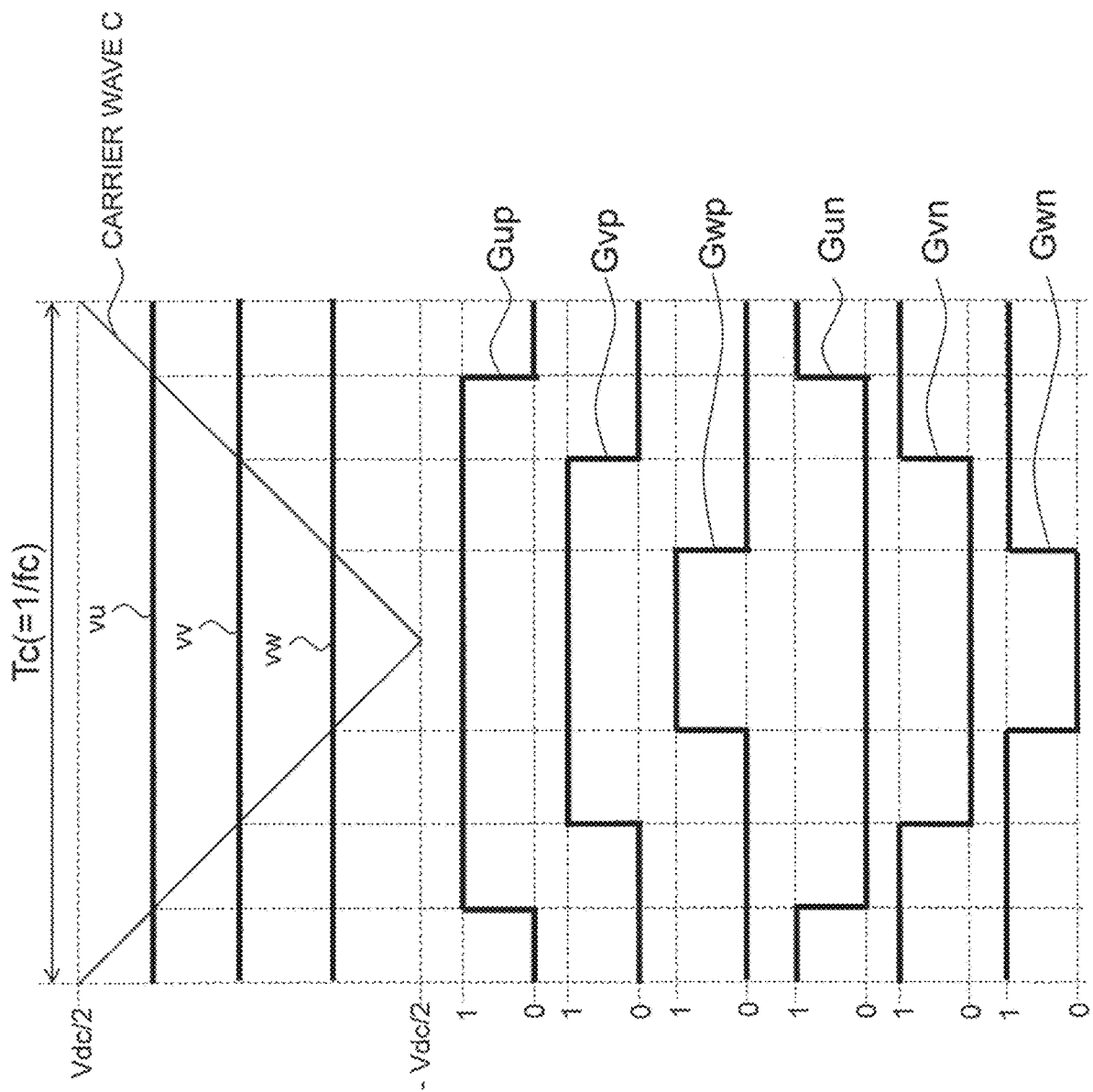
FIG. 2 is a diagram depicting switching signals Gup, Gyp, Gwp, Gun, Gvn, and Gwn generated by a pulse width modulation (PWM) signal generator according to the first embodiment.

In the following, an operation of generating the switching signals Gup, Gvp, Gwp, Gun, Gvn, and Gwn by the PWM signal generator 11 will be described with reference to FIG. 2. FIG. 2 is a diagram illustrating the switching signals Gup, Gvp, Gwp, Gun, Gvn, and Gwn generated by the PWM signal generator 11 according to the first embodiment of the present application.

As illustrated in FIG. 2, the PWM signal generator 11 compares each of the three-phase voltage commands vu, vv, and vw, input from the current controller 9 with a carrier wave C. The carrier wave C has a cycle Tc and a frequency fc.

As a result of the above-described comparison, when the U-phase voltage command vu is greater than the carrier wave C, the PWM signal generator 11 sets the switching signal Gup to "1" and the switching signal Gun to "0". When the U-phase voltage command vu is smaller than the carrier wave C, the PWM signal generator 11 sets the switching signal Gup to "0" and the switching signal Gun to "1". As described above, the value "1" corresponds to the ON command, and the value "0" corresponds to the OFF command.

Similarly, as a result of the above-described comparison, when the V-phase voltage command vv is greater than the carrier wave C, the PWM signal generator 11 sets the switching signal Gvp to "1" and the switching signal Gvn to "0". When the V-phase voltage command vv is smaller than the carrier wave C, the PWM signal generator 11 sets the switching signal Gyp to "0" and the switching signal Gvn to "1".

Similarly, as a result of the above-described comparison, when the W-phase voltage command vw is greater than the carrier wave C, the PWM signal generator 11 sets the switching signal Gwp to "1" and the switching signal Gwn to "0". When the W-phase voltage command vw is smaller than the carrier wave C, the PWM signal generator 11 sets the switching signal Gwp to "0" and the switching signal Gwn to "1".

It goes without saying that a short circuit prevention time, i.e. a dead time, may be provided so that there is not a period in which both the switching element on the upper arm side of the inverter 5 and the switching element on the lower arm side are in the ON states.

In this way, the controller 6 converts the three-phase current iu, iv, and iw flowing in the synchronous motor 1 into the d-axis current id and the q-axis current iq. The controller 6 performs the proportional integral control for a deviation between the d-axis current command id_ref and the d-axis current id so that the d-axis current id follows the d-axis current command id_ref, and thereby calculates the d-axis voltage command vd. Moreover, the controller 6 performs the proportional integral control for a deviation between the q-axis current command iq_ref and the q-axis current iq so that the q-axis current iq follows the q-axis current command iq_ref, and thereby calculates the q-axis voltage command vq. The controller 6 converts the d-axis voltage command vd and the q-axis voltage command vq into the three-phase voltage commands vu, vv, and vw, and controls the inverter 5 according to the three-phase voltage commands vu, vv, and vw.

For example, the frequency fc of the carrier wave C is set so as to fall within a range from 18 kHz to 20 kHz, in order to reduce noises of the electric power steering device. In the following descriptions, the frequency fc of the carrier wave C will be specifically assumed to be 20 kHz, as an example. In this case, the frequency fc is an inverse of the cycle Tc, i.e. 1/Tc. Thus, the cycle Tc of the carrier wave C is 50 µs.

Figure 3:
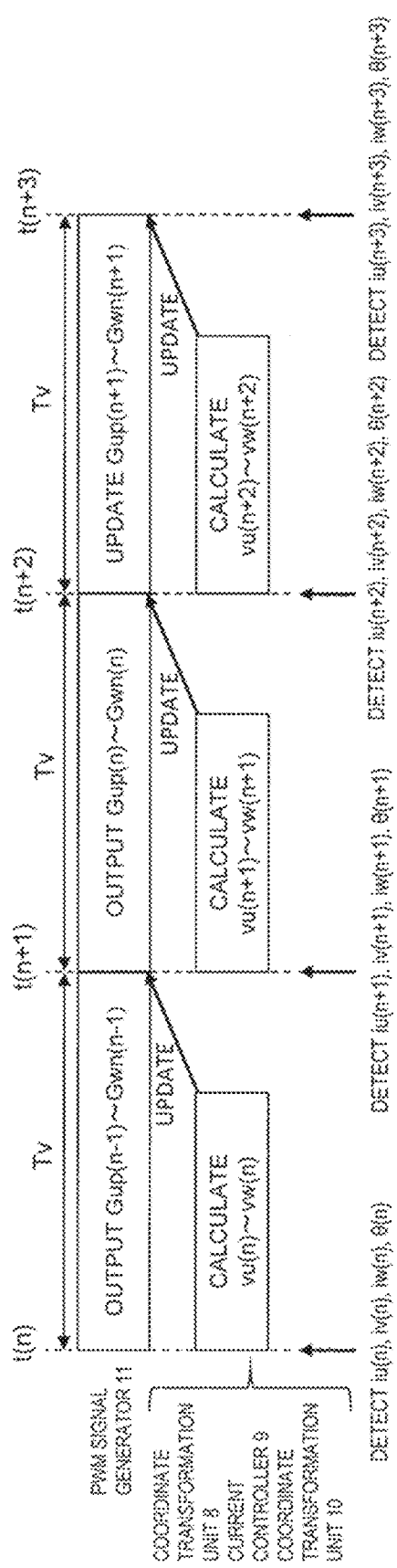
FIG. 3 is a diagram depicting relations between timings of calculation of three-phase voltage commands vu, vv, vw by a controller according to the first embodiment and timings of output of the switching signals Gup, Gyp, Gwp, Gun, Gvn, and Gwn by the controller.

In the following, timings when the controller 6 calculates the three-phase voltage commands vu, vv, and vw, and timings when the controller 6 outputs the switching signal Gup, Gvp, Gwp, Gun, Gvn, and Gwn will be described with reference to FIG. 3. FIG. 3 is a diagram illustrating relations between the timings of calculating the three-phase voltage commands vu, vv, and vw by the controller 6, and the timings of outputting the switching signals Gup, Gvp, Gwp, Gun, Gvn, and Gwn by the controller 6.

As illustrated in FIG. 3, at time t(n), the three-phase currents iu(n), iv(n), and iw(n) are detected by the current detector 3. The magnetic pole position θ(n) is detected by the magnetic pole position detector 2. The above-described detected values are input to the coordinate transformation unit 8.

During a period from the time t(n) to time t(n+1), the above-described calculations performed by the coordinate transformation unit 8, the current controller 9, and the coordinate transformation unit 10, respectively, end, and the three-phase voltage commands vu(n), vv(n), and vw(n) are obtained. Then, at the time t(n+1), the calculated three-phase voltage commands vu(n), vv(n), and vw(n) are input to the PWM signal generator 11. Thus, at the time t(n+1), the three-phase voltage commands vu, vv, and vw, which are used for generating the switching signals Gup, Gvp, Gwp, Gun, Gvn, and Gwn, are updated to the three-phase voltage commands vu(n), vv(n), and vw(n), respectively.

At the time t(n+1), the PWM signal generator 11 outputs the switching signals Gup(n), Gvp(n), Gwp(n), Gun(n), Gvn(n), Gwn(n), which were generated by using the updated three-phase voltage commands vu(n), vv(n), and vw(n). Moreover, at the time t(n+1), three-phase current iu(n+1), iv(n+1), and iw(n+1) are detected by the current detector 3, and magnetic pole position θ(n+1) is detected by the magnetic pole position detector 2. The above-described detected values are input to the coordinate transformation unit 8.

During a period from the time t(n+1) to time t(n+2), the above-described calculations performed by the coordinate transformation unit 8, the current controller 9, and the coordinate transformation unit 10, respectively, end, and three-phase voltage commands vu(n+1), vv(n+1), and vw(n+1) are obtained. Then, at the time t(n+2), the calculated three-phase voltage commands vu(n+1), vv (n+1), and vw (n+1) are input to the PWM signal generator 11. Thus, at the time t(n+2), the three phase voltage commands vu, vv, and vw, which are used for generating the switching signals Gup, Gvp, Gwp, Gun, Gvn, and Gwn, are updated from the three-phase voltage commands vu (n), vv (n), and vw (n) to the three-phase voltage commands vu(n+1), vv(n+1), and vw(n+1).

At the time t(n+2), the PWM signal generator 11 outputs the switching signals Gup(n+1), Gvp(n+1), Gwp(n+1), Gun (n+1), Gvn(n+1), Gwn(n+1), which were generated by using the updated three-phase voltage commands vu(n+1), vv(n+1), and vw(n+1). Moreover, at the time t(n+2), three-phase current iu(n+2), iv(n+2), and iw(n+2) are detected by the current detector 3, and magnetic pole position θ(n+2) is detected by the magnetic pole position detector 2. The above-described detected values are input to the coordinate transformation unit 8.

During a period from the time t(n+2) to time t(n+3), the above-described calculations performed by the coordinate transformation unit 8, the current controller 9, and the coordinate transformation unit 10, respectively, end, and three-phase voltage commands vu(n+2), vv(n+2), and vw(n+2) are obtained. Also after the time t(n+3), the above-described calculations are repeatedly performed.

As illustrated in FIG. 3, the controller 6 updates the three-phase voltage commands vu, vv, vw with a cycle Tv. In the following, the cycle Tv will be referred to as a voltage command updating cycle Tv. Moreover, during the period from the detection of the three-phase currents iu, iv, and iw, and the magnetic pole position θ, to the output of the switching signals Gup, Gyp, Gwp, Gun, Gvn, and Gwn, the above-described detected values being reflected to the three-phase voltage commands vu, vv, and vw, a time delay of Tv occurs.

As illustrated in FIG. 2, in the first embodiment, under the control by the PWM (pulse wave modulation), voltage applied to the synchronous motor 1 is generated. Thus, reducing the voltage command updating cycle Tv to less than a half of the cycle Tc of the carrier wave C, does not provide any effect. That is, updating the three-phase voltage commands vu, vv, and vw within the voltage command updating cycle Tv, which is less than a half of the cycle Tc of the carrier wave C, does not provide any effect.

Thus, the voltage command updating cycle Tv is greater than or equal to the half of the cycle of the carrier wave C, Tc/2, and is set to an integer multiple of the half of the cycle, Tc/2. When the cycle Tc is 50 µs, as described above, the voltage command updating cycle Tv is greater than or equal to 25 µs, and set to an integer multiple of 25 µs.

Next, the current controller 9 will be described in detail. As illustrated in FIG. 1, the current controller 9 includes a current controller 9$d$ for calculating a d-axis voltage command vd, and a current controller 9$q$ for calculating a q-axis voltage command vq.

A deviation between a d-axis current command id_ref and a d-axis current id is input to the current controller 9$d$. The current controller 9$d$ calculates d-axis voltage command vd according to a formula (1-3), shown below, based on the input deviation.

[Math 2]

$$vd = (Kpd + Kid/s) \times (id\_ref - id) \qquad (1\text{-}3)$$

In formula (1-3), the expression "id_ref–id" represents the deviation between the d-axis current command id_ref and the d-axis current id, as described above. As shown in formula (1-3), multiplying the deviation by Kpd corresponds to an operation of a "proportional control", and multiplying the deviation by Kid/s corresponds to an "integration control", where Kpd is a d-axis proportional gain, Kid is a d-axis integral gain, and s is the Laplacian operator.

The d-axis proportional gain Kpd and the d-axis integral gain Kid are set according to formulas (1-4) and (1-5), respectively, as follows.

[Math 3]

$$Kpd = Kd/\tau d \times Ld \qquad (1\text{-}4)$$

$$Kid = R/\tau d \qquad (1\text{-}5)$$

In the above-described formulas, Kd is a constant greater than 0 and less than 1, τd is a time constant of the d-axis current control system, Ld is a d-axis inductance, and R is a coil resistance.

A deviation between a q-axis current command iq_ref and a q-axis current iq is input to the current controller 9q. The current controller 9q calculates q-axis voltage command vq according to formula (1-6), shown below, based on the input deviation.

[Math 4]

$$vq = (Kpq + Kiq/s) \times (iq\_ref - iq) \quad (1\text{-}6)$$

In formula (1-6), the expression "iq_ref−iq" represents the deviation between the q-axis current command iq_ref and the q-axis current iq, as described above. As shown in formula (1-6), multiplying the deviation by Kpq corresponds to an operation of the "proportional control", and multiplying the deviation by Kiq/s corresponds to the "integration control", where Kpq is a q-axis proportional gain, Kiq is a q-axis integral gain, and s is the Laplacian operator.

The q-axis proportional gain Kpq and the q-axis integral gain Kiq are set according to formulas (1-7) and (1-8), respectively, as follows.

[Math 5]

$$Kpq = Kq/\tau q \times Lq \quad (1\text{-}7)$$

$$Kiq = R/\tau q \quad (1\text{-}8)$$

In the above-described formulas, Kq is a constant greater than 0 and less than 1, τq is a time constant of the q-axis current control system, Lq is a q-axis inductance at a reference operating point of the synchronous motor 1. At operating points of the synchronous motor 1 other than the reference operating point, the q-axis proportional gain Kpq may be set according to formula (1-7) using a q-axis inductance depending on the operating point, taking into account magnetic saturation.

In the following, methods of setting the q-axis proportional gain Kpq and the q-axis integral gain Kiq will be described. As described above, formulas (1-7) and (1-8) include the time constant τq, the constant Kq, the q-axis inductance Lq, and the coil resistance R. The q-axis inductance Lq and the coil resistance R are set as follows. Methods of setting the time constant τq and the constant Kq will be described later.

For example, when the q-axis inductance Lq and the coil resistance R are measured offline in advance, results calculated by using results of the measurements according to formulas (1-7) and (1-8) are previously incorporated into the controller 6 by a designer of the controller 6. As another example, when the q-axis inductance Lq and the coil resistance R are calculated according to electromagnetic field analysis in advance, results calculated by using results of the calculation according to formulas (1-7) and (1-8) are previously incorporated into the controller 6 by the designer.

When a program for determining by the controller 6 the q-axis inductance Lq and the coil resistance R online is previously incorporated in the controller 6 by the designer, the controller 6 determines the q-axis inductance Lq and the coil resistance R online. Then, the controller 6 calculates the q-axis proportional gain Kpq and the q-axis integral gain Kiq by using results of the determination according to formulas (1-7) and (1-8).

Figure 4:
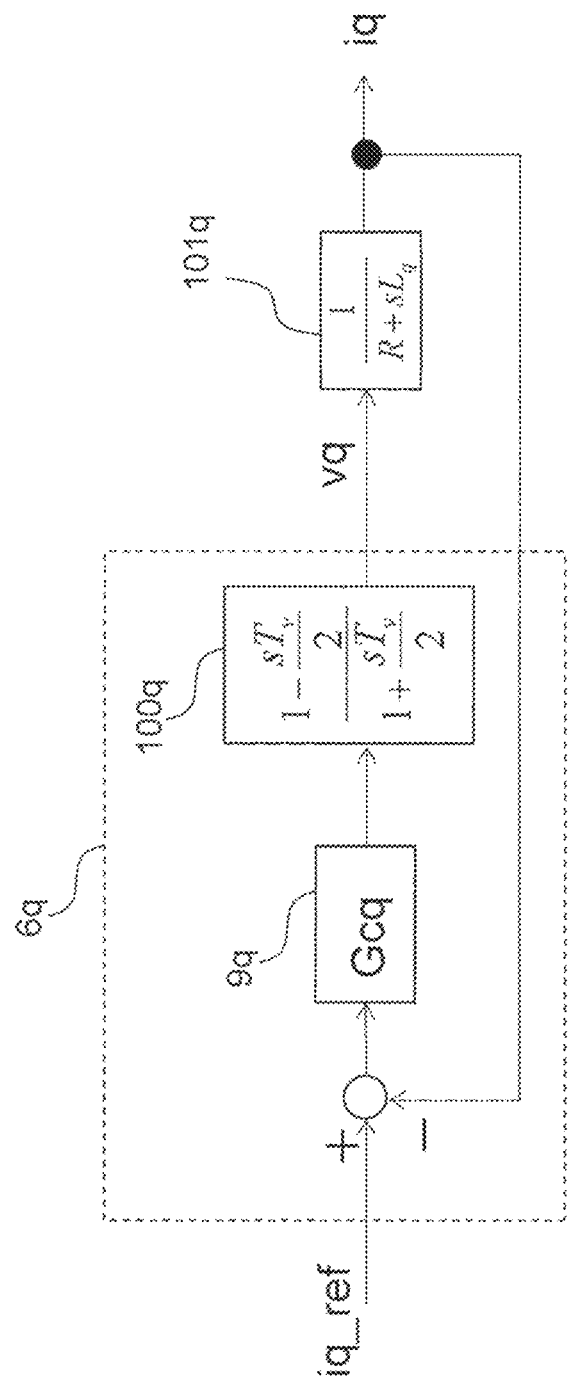
FIG. 4 is a block diagram depicting a configuration of a current control system according to the first embodiment.

In the following, the current control system including the current controller 9 will be described in detail with reference to FIG. 4. FIG. 4 is a block diagram depicting a configuration of the current control system according to the first embodiment. Note that in the illustration of the current control system in FIG. 4, the current command operating unit 7, the coordinate transformation unit 8, the coordinate transformation unit 10, and the PWM signal generator 11, which are present in FIG. 1, are omitted.

The current control system shown in FIG. 4 includes a q-axis current control unit 6q having a subtractor, a current controller 9q and a block 100q; and a block 101q.

A transfer function of the block 101q is a transfer function for the q-axis of the synchronous motor 1. The transfer function is expressed as a primary delay system including the coil resistance R and the q-axis inductance Lq. A q-axis voltage command vq is input to the block 101q. Then, the block 101q generates a q-axis current iq according to the transfer function, and outputs the q-axis current iq.

A voltage equation regarding q-axis voltage of the synchronous motor 1 is expressed by formula (1-9), shown below. The transfer function of the block 101q, i.e. the transfer function for the q-axis of the synchronous motor 1 can be easily derived from the voltage equation shown in formula (1-9) where a rotation angular velocity is set to zero (ω=0). When obtaining the transfer function, terms including the rotation angular velocity ω in formula (1-9) are regarded as disturbance and neglected.

[Math 6]

$$v_q = (R + s\, L_q)i_q + \omega(Ld\, i_d + \phi) \quad (1\text{-}9)$$

In formula (1-9), φ represents numbers of flux interlinkage.

A q-axis current command iq_ref and q-axis current iq are input to the q-axis current control unit 6q. Then, the q-axis current control unit 6q outputs a q-axis voltage command vq. The current controller 9q performs calculation according to the above-described formula (1-6). The transfer function of the block 100q is a transfer function expressing wasted time in the calculation on the q-axis.

As illustrated in FIG. 3, during the period from the detection of the three-phase currents iu, iv, and iw, and the magnetic pole position θ, to the output of the switching signals Gup, Gyp, Gwp, Gun, Gvn, and Gwn, the above-described detected values being reflected to the three-phase voltage commands vu, vv, and vw, a time delay of Tv occurs. Thus, the time delay of Tv is required to be take into account in the operation of the q-axis current control unit 6q. The expression in the transfer function of the block 100q in FIG. 3 has been obtained from a transfer characteristic of Tv, exp(−s×Tv), using the first order Padé approximation.

As illustrated in FIG. 4, a transfer characteristic Gq(s) from the q-axis current command iq_ref to the q-axis current iq is expressed by formula (1-10) as follows:

[Math 7]

$$G_q(s) = \frac{-L_q \cdot K_q \cdot T_V s^2 + (2L_q K_q - T_V R)s + 2R}{L_q \tau_q T_V s^3 + (2\tau_q L_q + \tau_q T_V R - L_q \cdot K_q \cdot T_V)s^2 + (2\tau_q R + 2L_q \cdot K_q - T_V R)s + 2R} \quad (1\text{-}10)$$

Moreover, between the time constant iq and a response angular frequency ωcq there is a relation expressed by ωcp=1/τq. The response angular frequency ωcq is the same as a corner frequency in formula (1-10). In this case, the gain of Gq(s) of formula (1-10) is −3 dB. Thus, the following relation (1-11) is obtained.

[Math 8]

$$|G_q(j\omega_{cq})| = \frac{1}{\sqrt{2}} \quad (1\text{-}11)$$

Furthermore, when the expression (1-10) is substituted in the expression (1-11) and the expression is solved for the constant Kq, the following relation (1-12) is obtained.

[Math 9]

$$K_q = \frac{-B + \sqrt{B^2 - 4AC}}{2A} \quad (1\text{-}12)$$

In formula (1-12), the terms A, B and C are expressed by the following formulas (1-13), (1-14), and (1-15), respectively.

[Math 10]

$$A = 2(\omega_{cq}{}^2 * T_v)^2 + 2\omega_{cq}{}^2(2Lq)^2 - (2\omega_{cq}L_q)^2 - (\omega_{cq}{}^2 L_q T v)^2 \quad (1\text{-}13)$$

$$B = 8R\omega_{cq}{}^2 L_q T_v - 8\omega_{cq}{}^2 L_q T_v R - 4\omega_{cq} L_q (2R - \omega_{cq} T_v R - \omega_{cq}{}^2 L_q T_v) - 2\omega_{cq}{}^2 L_q T_v (2R - 2\omega_{cq} L_q - \omega_{cq} T_v R) \quad (1\text{-}14)$$

$$C = 8R^2 + 2\omega_{cq}{}^2 (T_v R)^2 - (2R - \omega_{cq} T_v R - \omega_{cq}{}^2 L_q T_v)^2 - (2R - 2\omega_{cq} L_q - \omega_{cq} T_v R)^2 \quad (1\text{-}15)$$

In the following, results of calculation for the constant Kq, when the constant Kq is calculated according to formula (1-12), while changing each of the voltage command updating cycle Tv and the response frequency ($\omega cq/2\pi$), will be described with reference to FIG. 5. FIG. 5 is a table showing the results of calculation for the constant Kq when each of the voltage command updating cycle Tv and the response frequency ($\alpha q/2\pi$) is changed in the first embodiment.

In the calculation, the coil resistance R is set to 10 mΩ, and the q-axis inductance Lq is set to 50 µH. Note that even when the value of the coil resistance R and the value of the q-axis inductance Lq fluctuate, the value of the constant Kq almost remains unchanged. But, the value of the constant Kq varies with the value of the response frequency ($\omega cq$). Numerical values shown in FIG. can be applied to synchronous motors having the coil resistance R and the q-axis inductance Lq that can take various values. Moreover, instead of the value of the q-axis inductance Lq, "d$\phi$q/diq", which will be described in a second embodiment, may be used.

As shown in FIG. 5, the voltage command updating cycle Tv are set to be integer multiple of 25 µs. Moreover, the response frequency ($\omega cq/2\pi$) are set to fall within a range from 100 Hz to 1000 Hz taking into account following property to a steering torque. When converting the response frequency ($\omega cq/2\pi$) into the time constant τq, the time constant iq falls within a range from 159 µs to 1592 µs.

As can be seen from FIG. 5, the results of calculations for the constant Kq show that the value of the constant Kq is greater than 0 and less than 1. That is, the value of the constant K is found to be different from 1, which is inconsistent with the conventional proportional gain design, described as above.

In the electric power steering device, it is extremely important to set the time constant of the current control system to a value designed in advance. Moreover, when the controller 6 is configured so as to perform a vector control according to the discrete time control, the voltage command updating cycle Tv is not small enough to neglect compared with the time constant iq.

Thus, in the first embodiment, the value of the constant Kq is not set to 1, but set to be greater than 0 and less than 1, different from the conventional proportional gain design, described as above. As the voltage command updating cycle Tv becomes greater with respect to the time constant Iq, the value of the constant Kq decreases.

The results of calculations for the constant Kq, shown in FIG. 5, indicate that the voltage command updating cycle Tv is set to fall within a range from 25 µs to 500 µs, the time constant iq is set to fall within a range from 159 µs to 1592 µs, and the value of the constant Kq is set to be greater than 0 and less than 1. More specifically, the value of the constant Kq is set to fall within a range from 0.4482 to 0.9747. When converting the time constant iq into the response frequency ($\omega cq/2\pi$), the range from 159 µs to 1592 µs for setting the value of the time constant iq is equivalent to the range from 100 Hz to 1000 Hz for setting the response frequency ($\omega cq/2\pi$).

When the controller 6 is configured so that the vector control is performed according to the discrete time control with the above-described setting, it becomes possible to make an actual time constant of the current control system coincide with the designed value.

Regions in FIG. 5 enclosed by thick lines indicate values of the constant Kq, with which an overshoot amount to the q-axis current iq in response to the q-axis current command iq_ref, subjected to a step input, is less than 10% of a step width. In the electric power steering device, such an overshoot is preferably as small as possible.

Small overshoot is preferable, because when an overshoot occurs, the q-axis current iq becomes greater with respect to the q-axis current command iq_ref in response to the steering torque. In this case, a torque generated by the synchronous motor 1 becomes greater than a required torque for the synchronous motor 1 determined based on the steering torque. Then, the steering feeling for the steering wheel by the driver of the vehicle degrades. Furthermore, in the case of switch back operations of the steering wheel or the like, when the speed of operation for the steering wheel is changed abruptly, due to the overshoot, abnormal noise with a high frequency of a few hundred Hertz to a few kilo Hertz occurs. Then, an unpleasant feeling is imparted to the passengers of the vehicle.

Based on the above-described results of consideration, the time constant iq is set to be greater than or equal to 159 µs and less than or equal to 1592 µs, the voltage command updating cycle Tv to be greater than or equal to 25 µs and less than or equal to 500 µs, and the value of the constant Kq to be greater than or equal to 0.4827 and less than or equal to 0.9747. Thus, as can be seen from FIG. 5, the above-described overshoot can be controlled to be less than 10% of the step width.

Moreover, regarding the values which are set as above, when the voltage command updating cycle Tv is set to be greater than or equal to 25 µs and less than or equal to 300 µs, the maximum value of the constant Kq in the case where the above-described overshoot becomes greater than 10% of the step width can be reduced from 0.5758 to 0.5098.

Furthermore, regarding the values which are set as above, when the voltage command updating cycle Tv is set to be greater than or equal to 25 µs and less than or equal to 150 µs, the above-described overshoot can be controlled to be less than 10% of the step width irrelevantly of the value of the time constant τq.

Moreover, regarding the values which are set as above, when the value of the constant Kq is set to be greater than 0.5758 and less than or equal to 0.9747, the above-described overshoot can be controlled to be less than 10%, of the step width irrelevantly of the voltage command updating cycle Tv and the time constant iq.

Next, the method of setting the voltage command updating cycle Tv, the time constant τq and the constant Kq will be described. The voltage command updating cycle Tv and the time constant Iq are parameters which are previously designed and incorporated into the controller 6 by the designer, and incorporated into the controller 6.

When the parameters of the synchronous motor 1 are identified online, the constant Kq is calculated online and set, for example, by calculating by the controller 6 online according to formulas (1-12), (1-13), (1-14), and (1-15) by using results of the identifying. When the parameters of the synchronous motor 1 have been already identified offline, the constant Kq is calculated, as another example, by using the results of the identifying, previously according to formulas (1-12), (1-13), (1-14), and (1-15). The calculated results are incorporated into the controller 6.

In the following, the process of making the time constant Iq coincide with the designed value in the operation of setting the voltage command updating cycle Tv, the time constant Iq, and the constant Kq in the first embodiment will be described, with reference to FIGS. 6 and 7.

Figure 6:
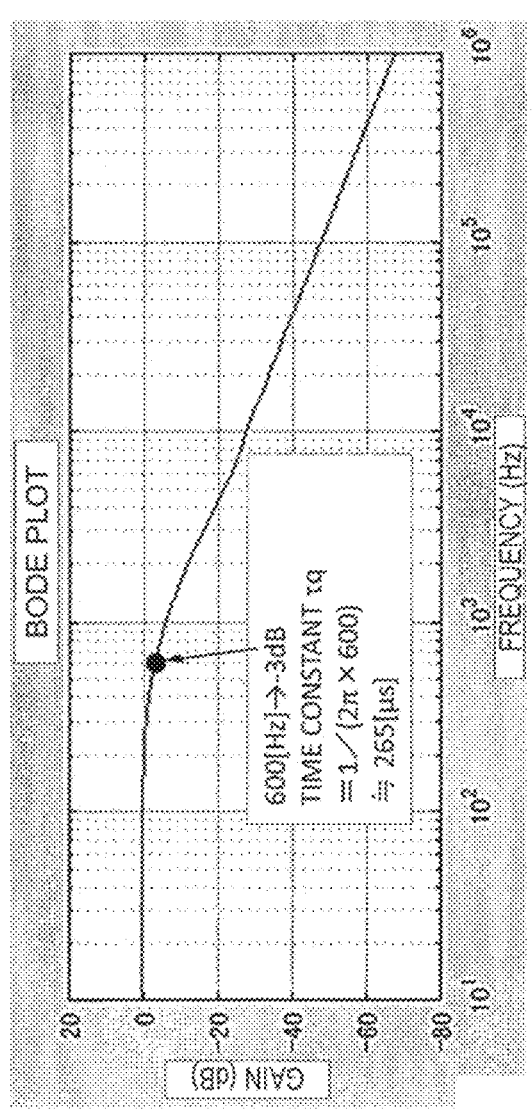
FIG. 6 is a Bode plot for a transfer characteristic $G_q(s)$ according to the first embodiment.

FIG. 6 is a Bode plot for a transfer characteristic $G_q(s)$ according to the first embodiment. FIG. 7 is a diagram depicting step responses of the transfer characteristic $G_q(s)$ according to the first embodiment. FIGS. 6 and 7 depict examples of a Bode plot and step responses of the transfer characteristic Gq(s) expressed in formula (1-10), respectively.

Figure 7:
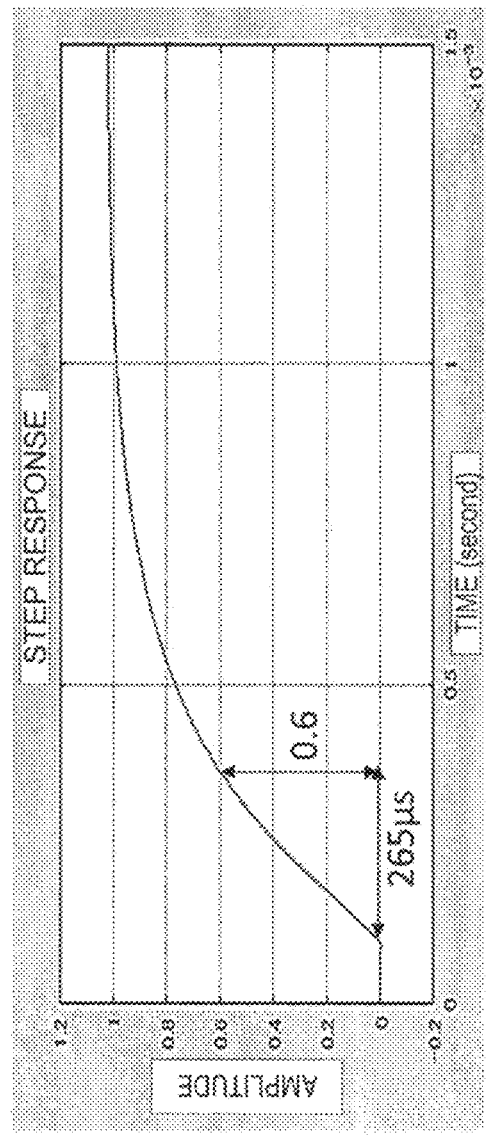
FIG. 7 is a diagram depicting step responses of the transfer characteristic $G_q(s)$ according to the first embodiment.

As shown in FIGS. 6 and 7, the transfer characteristic Gq(s) essentially exhibits characteristic of a primary delay system. In the primary delay system, when the angular frequency takes a value of an inverse of the time constant of the step response, the gain characteristic of the Bode plot becomes −3 dB. Thus, in the primary delay system, an inverse of an angular frequency obtained by multiplying the frequency, at which the gain of the Bode plot becomes−3 dB, by $2n$ is the time constant of the step response.

For example, assume that the voltage command updating cycle Tv, the time constant τq, and the constant Kq are set according to formulas (1-11), (1-12), (1-13), and (1-14) so that the gain takes a value of −3 dB when the response frequency (ωcq/2π) is 600 Hz.

In this case, as shown in FIG. 6, when the response frequency (ωcq/2π) is 600 Hz, the gain takes a value of −3 dB. Moreover, as shown in FIG. 7, the step response of the transfer characteristic Gq(s) becomes about 0.6 times the steady-state value 1, at a time corresponds to an inverse of the response angular frequency cq, i.e. 1/(2π×600)=265 μs. Accordingly, the time constant τq with the designed value is found to be obtained.

As described above, the current controller 9q for the q-axis has been explained. When the same policy is applied to the current controller 9d for the d-axis, it becomes possible to make the actual time constant id in the current control system coincide with a designed value. That is, by performing the above-described process, the constant Kd is calculated depending on the voltage command updating cycle Tv and the time constant id. By applying the constant Kd to the d-axis proportional gain Kpd, it becomes possible to make the actual time constant id in the current control system coincide with the designed value.

In the above-described formula (1-7), the q-axis inductance Lq is used for the inductance L. However, when a difference between the q-axis inductance Lq and the d-axis inductance Ld is small, the d-axis inductance Ld may be used for the inductance L instead of the q-axis inductance Lq.

As described above, according to the first embodiment, in the control device in the electric power steering device, the q-axis proportional gain Kpq, which is used in the proportional integral control performed for a deviation between the q-axis current command and the q-axis current, is set by the time constant iq of the q-axis current control system, the q-axis inductance or the d-axis inductance L, and the constant Kq, which is greater than 0 and less than 1, through the following relation: Kpq=Kq/τq×L.

According to the above-described configuration, even when a vector control is performed according to discrete time control, a deviation between the actual time constant of the current control system and the designed value can be reduced. Moreover, the desired current response can be obtained in the electric power steering device. Consequently, it becomes possible to prevent abnormal noise from the electric power steering device from occurring, and suppress a delay in a response of a torque assisting the steering operation for the steering wheel. Furthermore, also in an electric power steering device, in which a synchronous motor, an inverter, and a control circuit are integrated, it becomes possible to obtain a desired current response.

Second Embodiment

In the second embodiment, a control device of an electric power steering device, in which a configuration of a current controller $9q$ is different from the current controller $9q$ in the first embodiment, will be described. In the second embodiment, descriptions on configurations, which are the same as those in the first embodiment, will be omitted, and configurations different from the first embodiment will be mainly described.

The current controller $9q$ calculates q-axis voltage command vq according to formula (2-1), shown below, based on a deviation between q-axis current command iq_ref and q-axis current iq.

[Math 11]

$$vq=(Kpq'+Kiq/s)×(iq\_ref−iq) \qquad (2\text{-}1)$$

In formula (2-1), Kpq' represents the q-axis proportional gain. The q-axis proportional gain Kpq' is set according to formula (2-2), shown below. The q-axis integral gain Kiq is set according to formula (1-8) in the same way as the q-axis integral gain in the first embodiment.

[Math 12]

$$Kpq'=Kq/\tau q×d\phi q/diq \qquad (2\text{-}2)$$

In formula (2-2), dϕq represents a q-axis infinitesimal magnetic flux at a reference operating point, and diq represents a q-axis infinitesimal current at the reference operating point. Moreover, the constant Kq and the time constant τq are the same as those in the first embodiment.

In the following, a method of setting the q-axis proportional gain Kpq' will be described. As described above, in formula (2-2), the time constant τq, the constant Kq and "dϕq/diq" are used. The time constant iq and the constant Kq are set as those in the first embodiment, and "dϕq/diq" is set as follows.

As an example, when the q-axis inductance Lq, "dϕq/diq" and the coil resistance R are measured offline in advance, results calculated by using results of the measurements according to formula (2-2) are previously incorporated into the controller 6 by the designer of the controller 6. As another example, when the q-axis inductance Lq, "dϕq/diq", and the coil resistance R are calculated according to electromagnetic field analysis in advance, results calculated by using results of the calculation according to formula (2-2) are previously incorporated into the controller 6 by the designer.

When a program for determining online by the controller 6 the q-axis inductance Lq, "dϕq/diq", and the coil resistance R is previously incorporated in the controller 6 by the designer, the controller 6 determines online the q-axis inductance Lq, "dϕq/diq", and the coil resistance R. Then, the controller 6 calculates the q-axis proportional gain Kpq' using results of the determination according to formula (2-2).

Figure 8:
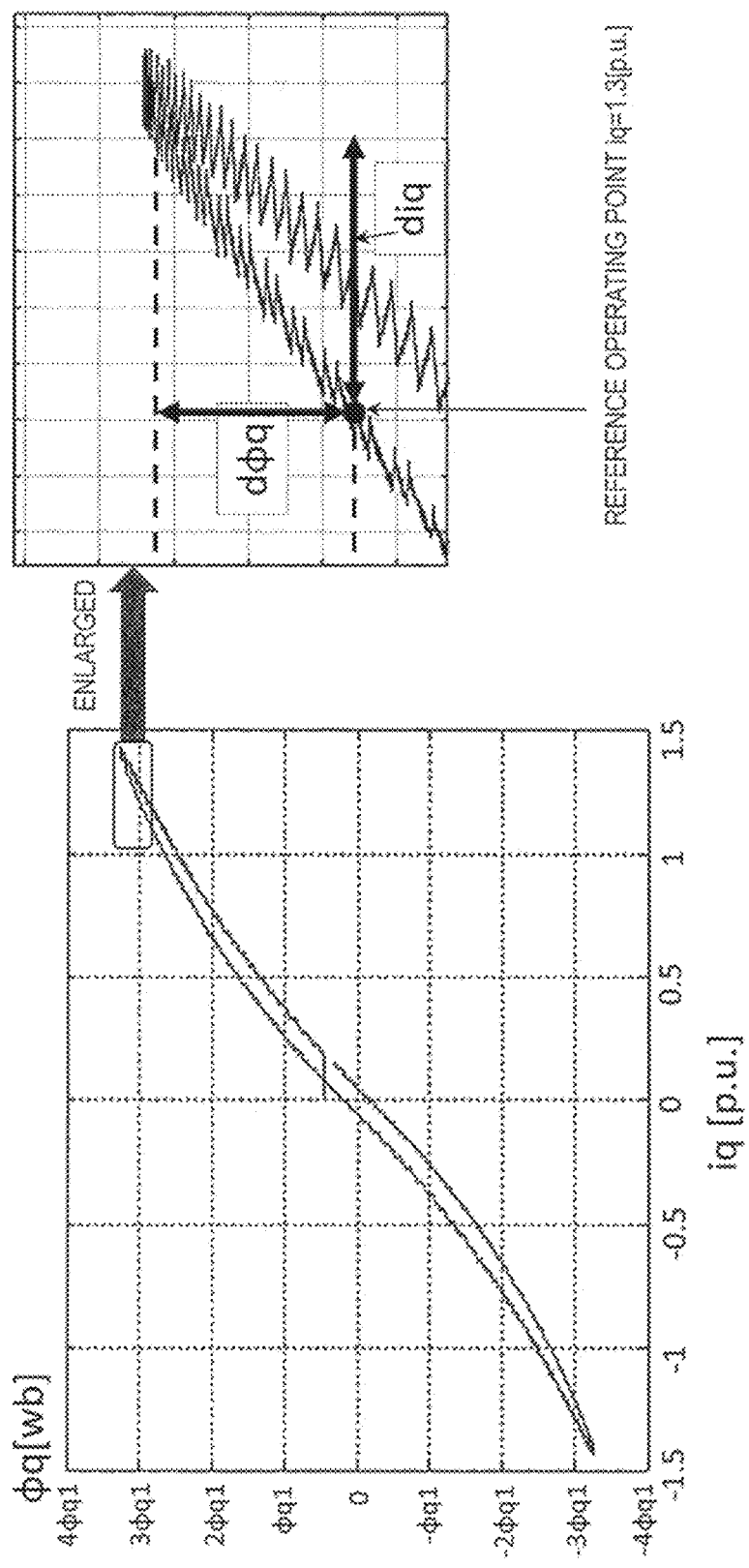
FIG. 8 is a diagram showing a $\phi_q$-$i_q$ characteristic representing a relation between q-axis magnetic flux $\phi_q$ and q-axis current $i_q$ according to a second embodiment.

In the following, the method of obtaining "dϕq/diq", which appears in formula (2-2), will be described in detail. FIG. 8 is a diagram depicting a $\phi_q$-$i_q$ characteristic representing a relation between q-axis magnetic flux $\phi_q$ and q-axis current iq according to the second embodiment. FIG. 8 illustrates the $\phi_q$-$i_q$ characteristic in the case of using a synchronous motor with embedded magnets or an interior permanent magnet (IPM) motor as the synchronous motor 1.

First, a reference operating point is fixed, as shown in FIG. 8. FIG. 8 illustrates the case where the reference operating point is fixed at iq=1.3 [p.u.]. Next, a q-axis infinitesimal current diq and a q-axis infinitesimal magnetic flux dϕq are obtained at the reference operating point. From the values obtained as above, "dϕq/diq" is obtained. The value of "dϕq/diq" is applied to formula (2-2).

The reference operating point is an operating point fixed in advance by the designer. The reference operating point has been set to an operating point at which parameters of the synchronous motor 1 can be analyzed, or identified by an offline measurement or an online measurement. The parameters of the synchronous motor 1 include the q-axis inductance Lq, "dϕq/diq" and the coil resistance R.

The number of the reference operating points is not limited to one, and a plurality of reference operating points may be fixed. In this case, values of "dϕq/diq" are calculated for the plurality of reference operating points, respectively. Then, by performing linear interpolation for the values of "dϕq/diq" at two reference operating points, a value of "dϕq/diq" at an operating point other than the reference operating points is calculated. The value of "dϕq/diq", obtained as above, is reflected to formula (2-2). The q-axis proportional gain Kpq' at the operating point other than the reference operating point is set by multiplying the q-axis proportional gain Kpq' at the reference operating point and a predetermined coefficient. The predetermined coefficient is set based on "dϕq/diq" at the operating point.

When the parameters of the synchronous motor 1 have been obtained through the analysis or the offline measurement in advance, the q-axis proportional gain Kpq' at the operating point other than the reference operating point may be previously incorporated into the controller 6 by the designer. When the parameters of the synchronous motor 1 are identified through the online measurement, the controller 6 may calculate the q-axis proportional gain Kpq' at the operating point other than the reference operating point using results of the identification, according to formula (2-2).

According to the above-described configuration, when a synchronous motor with embedded magnets is used for the synchronous motor 1, a desired current response also at an operating point other than the reference operating point of the synchronous motor 1.

Figure 9:
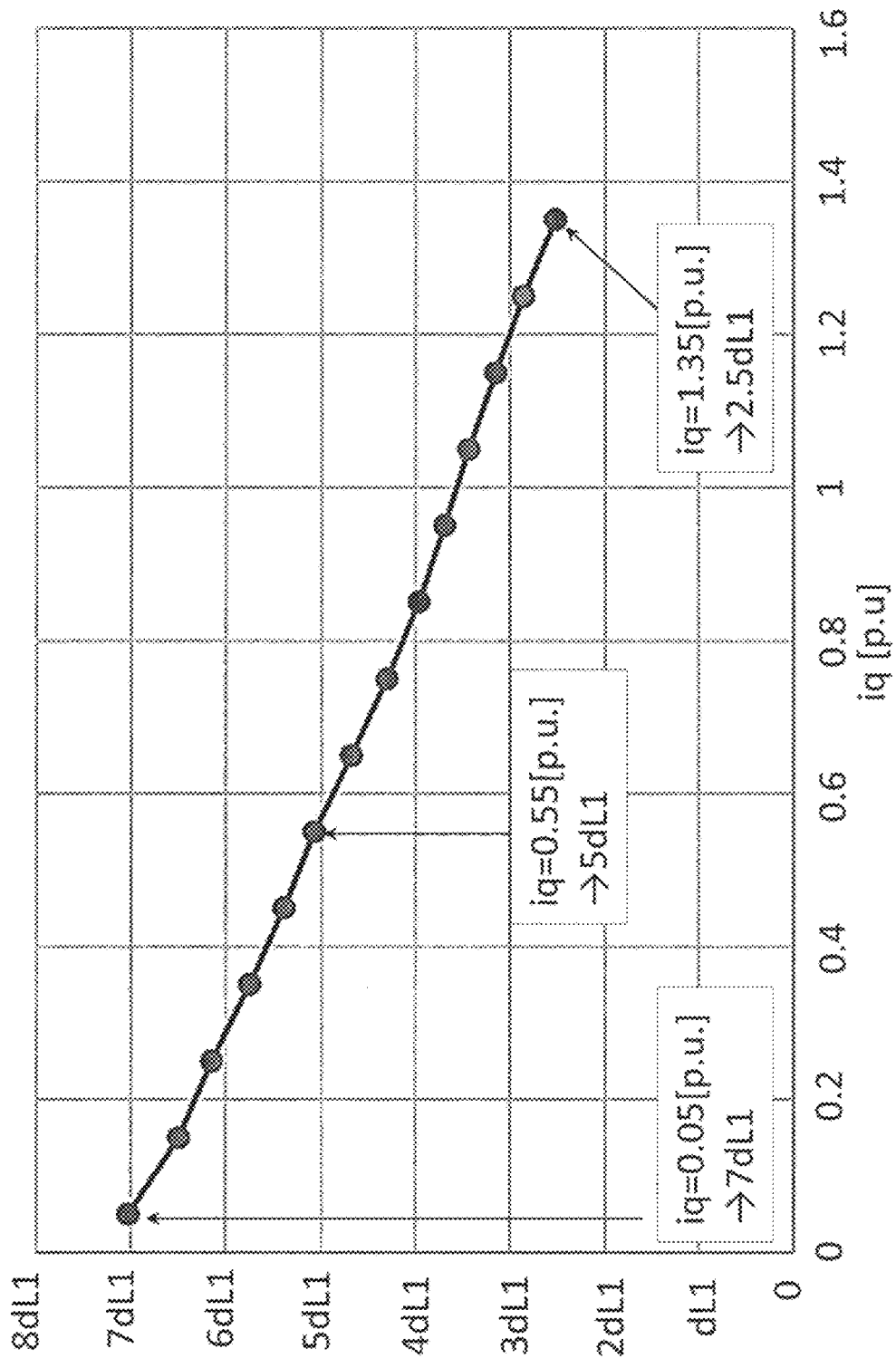
FIG. 9 is a diagram showing a "$d\phi_q/di_q$"-$i_q$ characteristic representing a relation between "$d\phi_q/di_q$" and q-axis current $i_q$ according to the second embodiment.

In the following, a characteristic of "dϕq/diq" for the q-axis current iq will be described with reference to FIG. 9. FIG. 9 is a diagram illustrating a "dϕq/diq"-iq characteristic representing a relation between "dϕq/diq" and the q-axis current iq according to the second embodiment. The vertical axis in FIG. 9 has scales at integer multiples of dL1.

For example, in FIG. 9, "dϕq/diq" can be identified within a range from iq=0.05 to 1.35, any point within the range can be fixed as the reference operating point.

In the following, an example with the reference operating point fixed at iq=0.05 [p.u.] will be illustrated. The q-axis proportional gain Kpq' at the refence operating point is set according to formula (2-2).

FIG. 9 shows that "dϕq/diq" at iq=0.05 [p.u.] which corresponds to the reference operating point is 7L1. Moreover, "dϕq/diq" at an operating point other than the reference operating point, for example, at iq=0.55 [p.u.] is 5L1, which can be read from FIG. 9.

Thus, the q-axis proportional gain Kpq' at the operating point is set by multiplying the q-axis proportional gain Kpq' at the above-described reference operating point and a predetermined coefficient. In this example, the predetermined coefficient is set to 5L1/7L1. In this way, the predetermined coefficient, by which the q-axis proportional gain Kpq' at the reference operating point is multiplied, is set to a value obtained by dividing "dϕq/diq" at the operating point by "dϕq/diq" at the reference operating point.

When current flowing in the synchronous motor 1 is smaller than a specified value, "dϕq/diq" is almost the same as the q-axis inductance Lq. Thus, when "dϕq/diq" is almost the same as the q-axis inductance Lq, the q-axis proportional gain Kpq' at the reference operating point may be set according to formula (1-7) described in the first embodiment. In this case, the predetermined coefficient, by which the q-axis proportional gain Kpq' is multiplied at an operating point other than the reference operating point, is changed according to "dϕq/diq" at the operating point.

In the following, effects obtained according to the configuration of the current controller 9q in the second embodiment will be described. FIG. 8 shows the ϕq-iq characteristic exhibiting a non-linear property according to the magnetic saturation, i.e. an inclination of the characteristic varies depending on the q-axis current iq. In particular, when the q-axis current iq is large, an absolute value of the inclination of the characteristic is small, i.e. an absolute value of "dϕq/diq" is small.

Next, a relation between "dϕq/diq" and the q-axis proportional gain Kpq' will be described. Typically, the above-described formula (1-9) has been used for a voltage equation for the synchronous motor 1. However, the equation (1-9) is not optimal to be applied to a motor in which the value of "dϕq/diq" varies depending on the q-axis current iq. The second term on the right hand side of formula (1-9) is expressed using magnetic flux in a q-axis direction by formula (2-3), shown below.

[Math 13]

$$v_q = \left(Ri_q + \frac{d\phi_q}{dt}\right) + \omega(L_d i_d + \phi) \quad (2\text{-}3)$$

According to the relation among the q-axis magnetic flux $\phi q$, the q-axis inductance Lq, and the q-axis current iq, i.e. $\phi q = Lq\ iq$, when the relation is substituted into formula (2-3), the above formula (2-3) is expressed by formula (2-4) as follows.

[Math 14]

$$v_q = \left(Ri_q + \frac{d(L_q i_q)}{dt}\right) + \omega(L_d i_d + \phi) \quad (2\text{-}4)$$

Under the condition where the q-axis inductance Lq is regarded to be constant, i.e. magnetic saturation would not occur, the second term of the right hand side of formula (2-4) is expressed by formula (2-5), shown below.

[Math 15]

$$v_q = \left(Ri_q + L_q \frac{di_q}{dt}\right) + \omega(L_d i_d + \phi) \quad (2\text{-}5)$$

Formula (2-5) is equivalent to formula (1-9) taking into account the relation of s=d/dt. Thus, formula (1-9), which is typically used, can be effectively applied to a synchronous motor, in which the q-axis inductance Lq does not vary, i.e. magnetic saturation does not occur. However, when formula (1-9) is applied to a synchronous motor, in which the q-axis inductance Lq varies, i.e. magnetic saturation occurs, an error occurs in the q-axis voltage command vq, calculated as above.

Then, formula (2-4) is changed to formula (2-6), shown below. Formula (2-6) is different from formula (2-5) in that the q-axis inductance Lq in formula (2-5) is replaced with "d$\phi$q/diq" in formula (2-6).

[Math 16]

$$v_q = \left(Ri_q + \frac{d\phi_q}{di_q}\frac{di_q}{dt}\right) + \omega(L_d i_d + \phi) \quad (2\text{-}6)$$

Based on the above, when the q-axis proportional gain Kpq' is designed in the second embodiment, formula (2-2), which is obtained from formula (1-7) by replacing the q-axis inductance Lq with "d$\phi$q/diq". As shown in formula (2-2), the q-axis proportional gain Kpq' is set depending on "d$\phi$q/diq". According to the above-described setting, even when the $\phi$q-iq characteristic exhibits a waveform having a shape of hysteresis due to magnetic saturation, as illustrated in FIG. 8, an actual time constant $\tau$q of the current control system can be made coincide with a designed value. Then, even in the case of using a synchronous motor, in which magnetic saturation occurs, such as a synchronous motor with embedded magnets or an inset type permanent magnet synchronous motor, for the synchronous motor 1, a desired current response is obtained.

As described above, according to the second embodiment, by setting the q-axis proportional gain Kpq' based on "d$\phi$q/diq", even when current is supplied to the synchronous motor 1, a desired time constant $\tau$q is obtained.

Furthermore, FIG. 9 shows the "d$\phi$q/diq"-iq characteristic in which "d(q/diq" is 7L1 at the q-axis current iq of 0.05 [p.u.]. That is, when current flowing in the synchronous motor 1 is almost zero, "d$\phi$q/diq" is 7L1.

FIG. 9 also shows "d$\phi$q/diq"-iq characteristic in which "d$\phi$q/diq" is less than 3L1 at the q-axis current iq of 1.35 [p.u.]. That is, when current is supplied to the synchronous motor 1, "d$\phi$q/diq" is less than 3L1.

As described above, the synchronous motor 1 has a property that "d$\phi$q/diq" decreases as the q-axis current iq flowing in the synchronous motor 1 increases. Specifically, "d$\phi$q/diq", when current is supplied to the synchronous motor 1, is reduced from "d$\phi$q/diq", when the current flowing in the synchronous motor 1 is almost zero, by less than 3L1/7L1=3/7=43%. In the second embodiment, even in the case of using the synchronous motor 1 having characteristic that "d$\phi$q/diq", when current is supplied to the synchronous motor 1, is reduced from "d$\phi$q/diq", when the current flowing in the synchronous motor 1 is almost zero, by less than 50%, a desired current response is obtained.

In the following, the current controller 9d will be described. The current controller 9d calculates d-axis voltage command vd according to formula (2-7), shown below, based on a deviation between a d-axis current command id_ref and a d-axis current id.

[Math 17]

$$Vd = (Kpd' + Kid/s) \times (id\_ref - id) \quad (2\text{-}7)$$

In formula (2-7), Kpd' represents a d-axis proportional gain. The d-axis proportional gain Kpd' is set according to formula (2-8), shown below. The d-axis integral gain Kid is set according to formula (1-5), in the same way as in the first embodiment.

[Math 18]

$$Kpd' = Kd/\tau d \times d\phi d/did \quad (2\text{-}8)$$

In the above-described formula (2-8), d$\phi$d represents a d-axis infinitesimal magnetic flux at a reference operating point, and did represents a d-axis infinitesimal current at the reference operating point. Moreover, the constant Kd and the time constant $\tau$d are the same as those in the first embodiment. The d-axis proportional gain Kpd', shown in formula (2-8), is set in the same way as the q-axis proportional gain Kpq', described as above.

Figure 10:
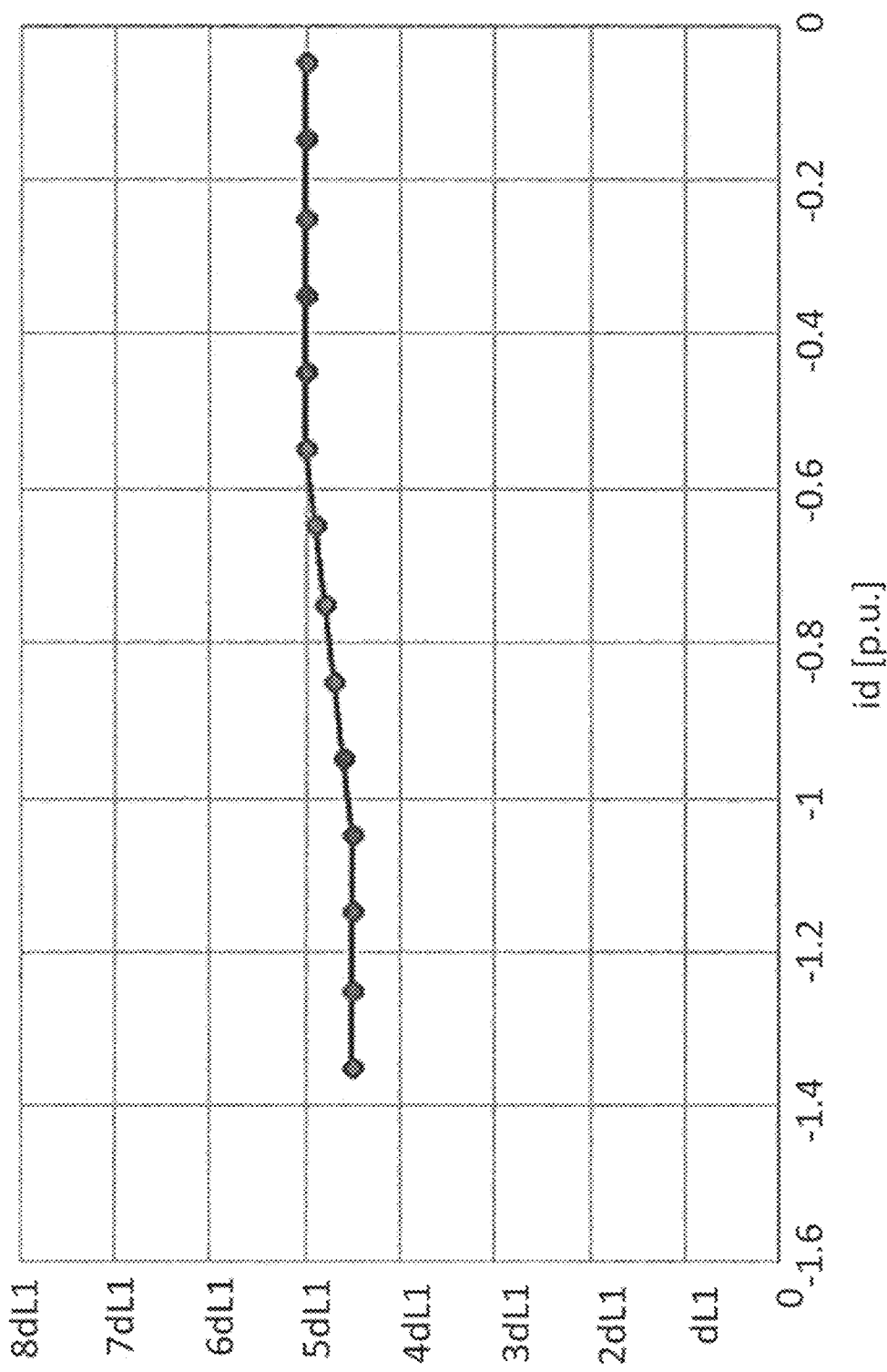
FIG. 10 is a diagram showing a "did/did"-id characteristic representing a relation between "$d\$)_d/di_d$" and d-axis current $i_d$ according to the second embodiment.

Next, characteristic of "d$\phi$d/did" for the d-axis current id will be described with reference to FIG. 10. FIG. 10 is a diagram depicting a "d$\phi$d/did"-id characteristic representing a relation between "d$\phi$d/did" and the d-axis current id according to the second embodiment. The vertical axis in FIG. 10 has scales at integer multiple of dL1, in the same way as in FIG. 9.

An amount of change of "d$\phi$d/did" with respect to the d-axis current id shown in FIG. 10 is smaller than an amount of change of "d$\phi$q/diq" with respect to the q-axis current iq shown in FIG. 9. When the current flowing in the synchronous motor 1 is smaller than a specified value, a relation "d$\phi$q/diq">"d$\phi$d/did" is satisfied. On the other hand, when the current flowing in the synchronous motor 1 is greater than the specified value, a relation "d$\phi$q/diq"<"d$\phi$d/did" is satisfied.

Thus, according to formulas (2-2) and (2-8), when the current flowing in the synchronous motor 1 is smaller than the specified value, the d-axis proportional gain Kpd' is set to be smaller than the q-axis proportional gain Kpq', and when the current flowing in the synchronous motor 1 is greater than the specified value, the d-axis proportional gain Kpd' is set to be greater than the q-axis proportional gain Kpq'. According to the above-described setting, even in the case of using a synchronous motor, in which magnetic saturation occurs, such as a synchronous motor with embedded magnets or an inset type permanent magnet synchronous motor, for the synchronous motor 1, a desired current response is obtained.

As described above, according to the second embodiment, in the control device for the electric power steering device, the q-axis proportional gain Kpq', which is used in the proportional integral control performed for a deviation between the q-axis current command and the q-axis current, is set by the time constant Tq of the q-axis current control system, the q-axis infinitesimal magnetic flux diq, the q-axis infinitesimal current diq, and the constant Kq, which is greater than 0 and less than 1, through the following relation: Kpq'=Kq/τq×dϕq/diq. Even in the above-described case, the same effect as that in the first embodiment is obtained.

As examples of the present invention, the first embodiment and the second embodiment have been described. However, the present invention is not limited to the configurations in the first embodiment and the second embodiment, respectively. The configurations of the first embodiment and the second embodiment may be combined, modified or omitted as appropriate without departing from the scope of the invention.

REFERENCE SIGNS LIST 1 synchronous motor, 2 magnetic pole position detector, 3 current detector, 4 direct current power source, 5 inverter, 6 controller, 6q q-axis current controller, 7 current command operating unit, 8 coordinate transformation unit, 9 current controller, 9d current controller, 9q current controller, 10 coordinate transformation unit, 11 PWM signal generator, 12 steering wheel, 13 front wheel, 14 gear unit, 15 torque detector, 100q block, 101q block

The invention claimed is:

1. A control device for an electric power steering device comprising:
a direct current power source configured to output direct current voltage;
an inverter configured to convert the direct current voltage output from the direct current power source into alternating current voltage, and apply the alternating current voltage to a synchronous motor; and
a controller configured to convert three-phase current flowing in the synchronous motor into d-axis current and q-axis current, perform proportional integral control for a deviation between d-axis current command and the d-axis current so that the d-axis current follows the d-axis current command, to calculate d-axis voltage command, perform proportional integral control for a deviation between q-axis current command and the q-axis current so that the q-axis current follows the q-axis current command, to calculate q-axis voltage command, convert the d-axis voltage command and the q-axis voltage command into three-phase voltage command, and control the inverter based on the three-phase voltage command,
wherein a q-axis proportional gain $K_{pq}$, which is used in the proportional integral control performed for the deviation between the q-axis current command and the q-axis current, is set according to a relation $K_{pq}=K_q/\tau_q \times L$, where $\tau_q$ is a time constant of a q-axis current control system, L is a q-axis inductance or a d-axis inductance, and $K_q$ is a constant greater than zero and less than one, and wherein $K_q$ is chosen such that a step response overshoot of the controller is less than ten percent.

2. The control device for an electric power steering device according to claim 1,
wherein the time constant is set to be greater than or equal to 159 μs and less than or equal to 1592 μs,
a voltage command updating cycle, at which the controller updates the three-phase voltage command, is set to be greater than or equal to 25 μs and less than or equal to 500 μs, and
the constant is set to be greater than or equal to 0.4827 and less than or equal to 0.9747.

3. The control device for an electric power steering device according to claim 2,
wherein the voltage command updating cycle is set to be greater than or equal to 25 μs and less than or equal to 300 μs.

4. The control device for an electric power steering device according to claim 2,
wherein the voltage command updating cycle is set to be greater than or equal to 25 μs and less than or equal to 150 μs.

5. The control device for an electric power steering device according to claim 2,
wherein the constant is set to be greater than 0.5758 and less than or equal to 0.9747.

6. The control device for an electric power steering device according to claim 1, wherein the constant is set to be greater than or equal to 0.4827.

7. A control device for an electric power steering device comprising:
a direct current power source configured to output direct current voltage;
an inverter configured to convert the direct current voltage output from the direct current power source into alternating current voltage, and apply the alternating current voltage to a synchronous motor; and
a controller configured to convert three-phase current flowing in the synchronous motor into d-axis current and q-axis current, perform proportional integral control for a deviation between d-axis current command and the d-axis current so that the d-axis current follows the d-axis current command, to calculate d-axis voltage command, perform proportional integral control for a deviation between q-axis current command and the q-axis current so that the q-axis current follows the q-axis current command, to calculate q-axis voltage command, convert the d-axis voltage command and the q-axis voltage command into three-phase voltage command, and control the inverter based on the three-phase voltage command,
wherein a q-axis proportional gain $K_{pq}$, which is used in the proportional integral control performed for the deviation between the q-axis current command and the q-axis current, is set according to a relation $K_{pq}=K_q/\tau_q \times d\phi q/di_q$, where $\tau_q$ is a time constant of a q-axis current control system, dϕq is q-axis infinitesimal magnetic flux, $di_q$ is q-axis infinitesimal current, and $K_q$ is a constant greater than zero and less than one, and wherein $K_q$ is chosen such that a step response overshoot of the controller is less than ten percent.

8. The control device for an electric power steering device according to claim 7,
wherein the q-axis proportional gain at an operating point other than a reference operating point of the synchronous motor is set to a value obtained by multiplying the q-axis proportional gain at the reference operating point and a predetermined coefficient, the predetermined coefficient being determined based on $d\phi_q/di_q$ at the operating point.

9. The control device for an electric power steering device according to claim 7,
wherein the synchronous motor has characteristic that $d\phi_q/di_q$ decreases as the q-axis current flowing in the synchronous motor increases.

10. The control device for an electric power steering device according to claim 7,
wherein a d-axis proportional gain, which is used in the proportional integral control performed for the deviation between the d-axis current command and the d-axis current, is set to be smaller than the q-axis proportional gain when the q-axis current flowing in the synchronous motor is less than a specified value, and set to be greater than the q-axis proportional gain when the q-axis current flowing in the synchronous motor is greater than the specified value.

11. The control device for an electric power steering device according to claim 7,
wherein the time constant is set to be greater than or equal to 159 µs and less than or equal to 1592 µs,
a voltage command updating cycle, at which the controller updates the three-phase voltage command, is set to be greater than or equal to 25 µs and less than or equal to 500 µs, and
the constant is set to be greater than or equal to 0.4827 and less than or equal to 0.9747.

12. The control device for an electric power steering device according to claim 11,
wherein the voltage command updating cycle is set to be greater than or equal to 25 µs and less than or equal to 300 µs.

13. The control device for an electric power steering device according to claim 11,
wherein the voltage command updating cycle is set to be greater than or equal to 25 µs and less than or equal to 150 µs.

14. The control device for an electric power steering device according to claim 11,
wherein the constant is set to be greater than 0.5758 and less than or equal to 0.9747.

* * * * *